March 2, 1954  F. S. AJERO  2,670,880
SPREADER AND SEEDER APPARATUS
Original Filed Jan. 25, 1950  3 Sheets-Sheet 1
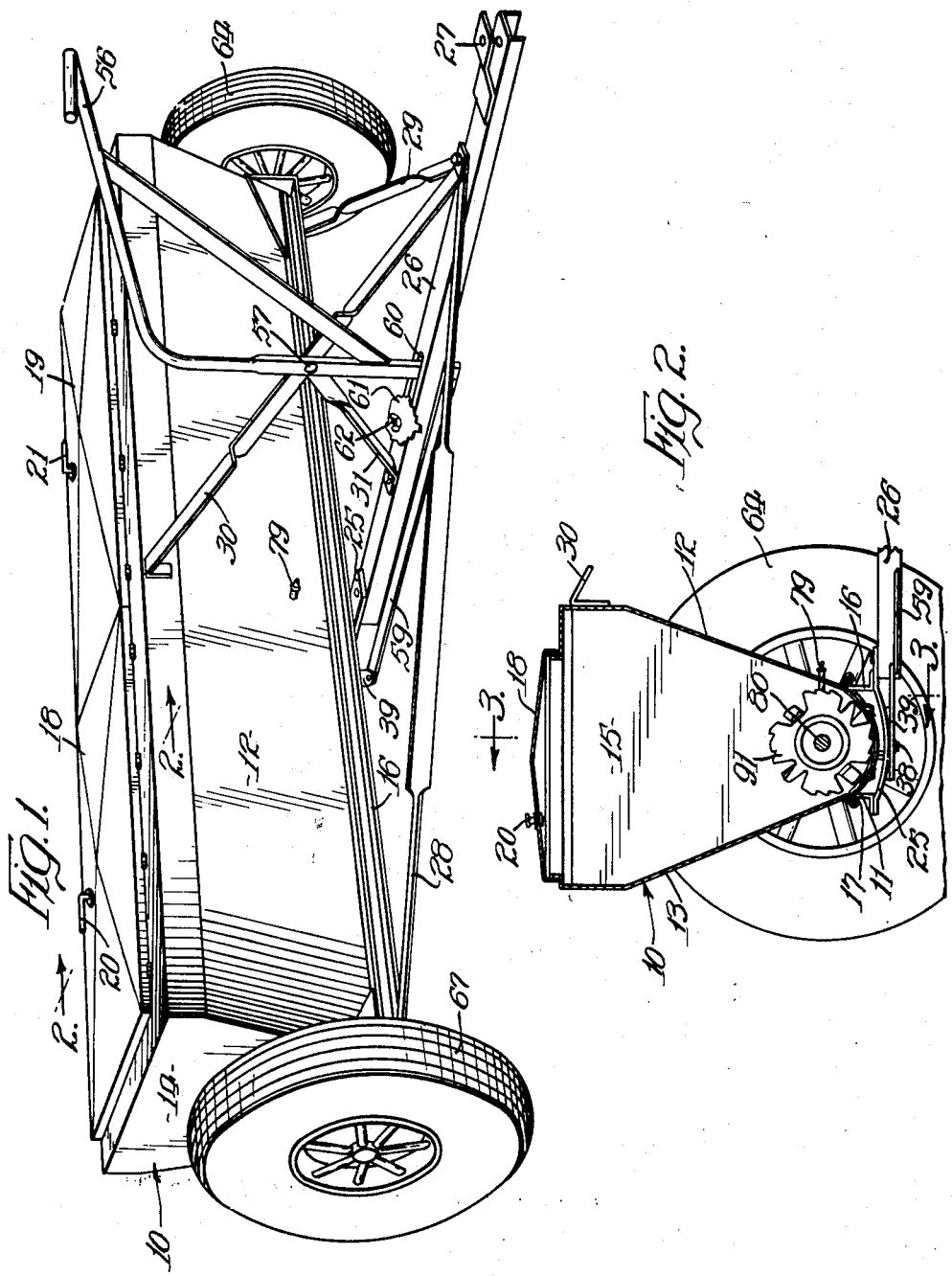
INVENTOR.
Fortunato S. Ajero
BY
Kegan and Kegan
Attys.

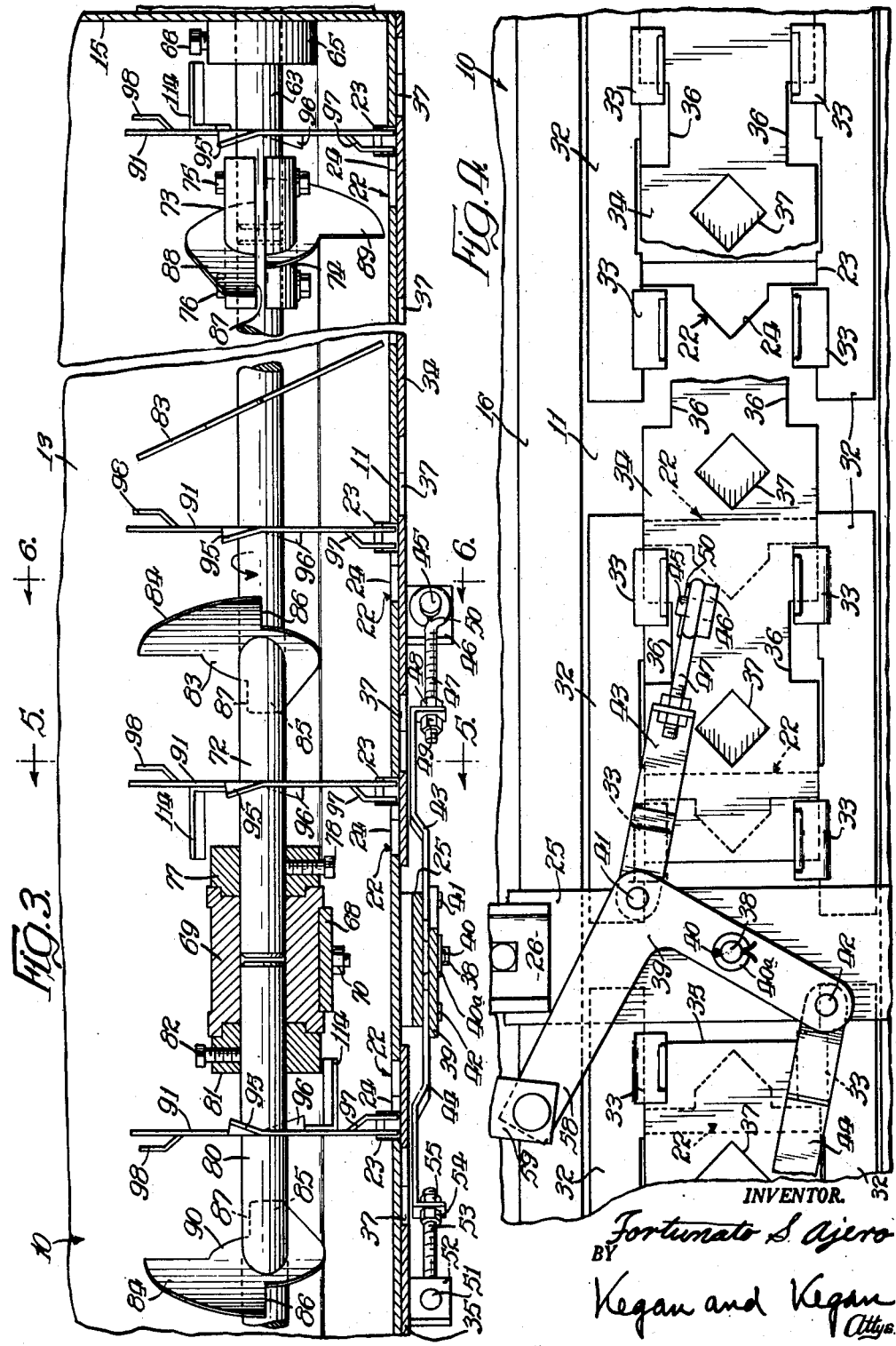

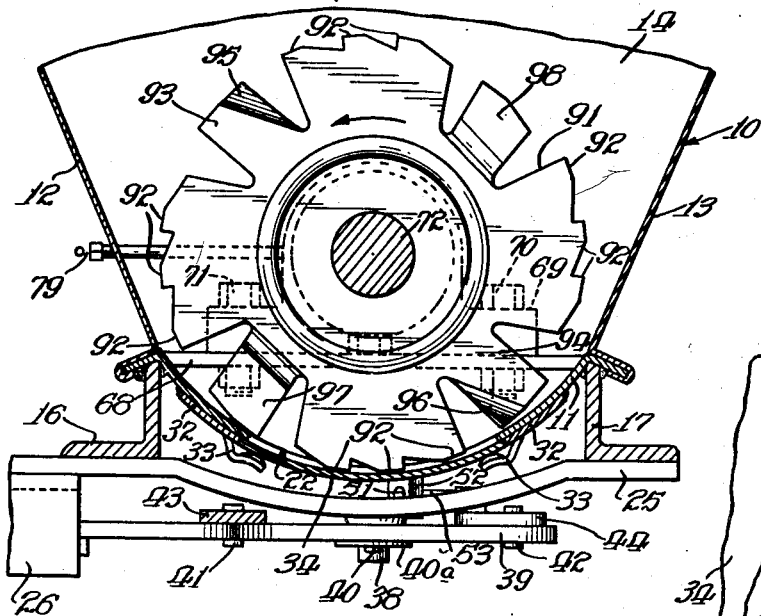

Patented Mar. 2, 1954

2,670,880

UNITED STATES PATENT OFFICE 2,670,880

SPREADER AND SEEDER APPARATUS

Fortunato S. Ajero, Chicago, Ill., assignor, by mesne assignments, to Avco Manufacturing Corporation, New York, N. Y., a corporation of Delaware Original application January 25, 1950, Serial No. 140,495, now Patent No. 2,626,729, dated January 27, 1953. Divided and this application March 9, 1951, Serial No. 214,787

8 Claims. (Cl. 222—272)

My invention relates generally to improvements in material spreading apparatus, and more particularly to apparatus for discharging fertilizers, seeds, fluent solid chemicals, and like material from the ported hopper of a spreader. My invention has special application to material spreaders of the type shown and described in Patent No. 2,510,231, issued June 6, 1950, to Edmond A. Juzwiak, and entitled Spreader.

This application is a divisional application of my co-pending case, Serial No. 140,495, filed January 25, 1950, now patented under No. 2,626,729, and entitled Spreader and Seeder Apparatus.

Many of the fertilizers used in agricultural work are of a highly cohesive, hygroscopic nature, and as a result there is a tendency for tunneling to occur within material spreader apparatus: that is, an arch of cohered material forms over the feed mechanism of the spreader apparatus and prevents the downward flow of material to the feed mechanism. A similar problem exists when dispensing wet, green or improperly cured organic fertilizers, as well as damp and/or densely packed seeds or grain.

I have discovered that one of the principal factors in the formation of tunnels within the hopper is the general use of material feeding and agitating mechanism which forces material radially and/or tangentially of the drive shaft on which the feeding and agitating members are mounted. As a result, material tends to become more densely packed on one side of the hopper than on the other, and forms a hard, dense core at the high pressure side which grows and spreads until it bridges across the hopper above the feed mechanism.

To the end of eliminating such packing and bridging and resulting tunneling within spreaders and seeder apparatus, and in addition, to improve the distribution of material therein, my invention comprises new and improved agitating means for a material spreader. I provide the usual hopper having discharge ports, rotatable shaft means in said hopper, and feed discs on the shaft. I further provide first means on said shaft means for propelling a flow of material lengthwise of and in one direction along said shaft means during each revolution of the latter, and second means on said shaft means for propelling a flow of material, of different amount than said first mentioned flow and concentric therewith, substantially lengthwise of and in the opposite direction along said shaft means during each revolution thereof. These differential flows of material provide an improved, uniform distribution of material throughout the length of the hopper.

Accordingly, it is a principal object of my invention to provide material dispensing apparatus for cohesive, hygroscopic, and damp materials, which prevents formation of tunnels within the hopper in which said material is placed.

Another object of the present invention is to provide material spreading apparatus which is characterized by a highly uniform distribution of material lengthwise of the feed mechanism within the hopper, so that the distribution of material to each discharge port in the hopper is uniform regardless of its position in said hopper.

The foregoing and such other objects, advantages and capabilities as are disclosed as this description proceeds, or which are inherent in my invention, are illustrated in the accompanying drawings, in which:

Figure 1 is a perspective view of a wheel supported material spreader embodying my invention;

Figure 2 is a fragmentary side elevational view taken in section on the line 2—2 of Figure 1;

Figure 3 is a fragmentary front elevational view taken in section on the line 3—3 of Figure 2;

Figure 4 is a fragmentary bottom view showing my novel shutter means and a portion of the control mechanism therefor;

Figure 5 is a fragmentary side elevational view taken in section on the line 5—5 of Figure 3;

Figure 6 is a fragmentary side elevational view taken in section on the line 6—6 of Figure 3; and Figure 7 is a fragmentary plan view of the bottom interior of the hopper, showing the discharge port partially open, the drive shaft being omitted for purposes of clarity.

Like reference characters designate like parts in the drawings and in the description of my invention following hereafter.

Before proceeding with the detailed description of the construction and operation of the several parts comprising the embodiments shown in the drawings, and to better indicate the concepts of my invention, I describe, in brief outline below, the organization and coaction of the principal subcombinations and parts comprising said embodiments. More particularly, my spreader and seeder apparatus is shown as including (1) a hopper in which the material is placed, said hopper having one or more discharge openings therein, (2) shutter means for regulating the discharge area of each of said discharge openings, (3) an armature rotatable within the hopper and including (4) means for agitating and distributing material lengthwise of the armature, with substantially longitudinal flows of material, and (5) means for positively discharging a measured quantity of material from each discharge port, in which the quantity discharged varies with the setting of the shutter means.

Turning now to Figures 1, 2 and 5, the hopper, designated generally by the numeral 10, includes an arcuate bottom plate 11, a front wall 12, a rear wall 13 and two end walls 14 and 15. A pair of angle irons 16 and 17 extend along the bottom of the hopper 10 to provide transverse stiffening at the points of connection between the front and rear walls 12 and 13 and the bottom plate 11. The hopper 10 is further provided with a pair of hinged covers 18 and 19 and their associated handles 20 and 21, whereby the hopper 10 may be loaded with material which is to be dispensed. As is best shown in Figure 7, taken in conjunction with Figure 3, the bottom plate 11 includes a plurality of spaced apart discharge openings 22, each of which includes a substantially rectangular portion 23 and a principal discharge area 24.

Referring again to Figures 1 and 5, a center bridging member 25 is secured to the lower leg portions of the angle irons 16 and 17. A drawbar 26 extends from and is secured to one end of the bridging member 25. A tractor hitch 27 is fastened to the other end of the drawbar 26. Two tie rods 28, 29 extend from opposite ends of the hopper 10 to the drawbar 26 adjacent the free end thereof. A third tie rod 30 extends from the upper portion of the front wall 12 to the drawbar 26, and is further strengthened by the stiffener 31.

As is best shown in Figures 3 and 4, a plurality of strips 32 are spaced along each side of the bottom plate 11, on the under surface thereof. A pair of spring fingers 33, 33 extend from each of the strips 32 toward the center line of the bottom plate 11, and provide sliding support for the shutter plates 34 and 35, said shutter plates 34 and 35 being positioned on opposite sides of the center bridging member 25. Figure 4 shows each of the shutter plates 34 and 35 as having a plurality of notches 36 in each longitudinal edge thereof, while in addition, each of the shutter plates 34 and 35 includes a plurality of apertures 37, the spacing of which corresponds to the spacing between the discharge openings 22 in the bottom plate 11. Similarly, the spacing of the notches 36 in the edges of the shutter plates 34 and 35 corresponds to the spacing of the spring fingers 33 of the strips 32; however, when the notches 36 are aligned with the fingers 33, the apertures 37 are out of register with the discharge openings 22.

Referring now to Figures 4 and 5, a hinge post 38 extends downwardly from the center bridging member 25. A bell crank 39 pivots on the hinge post 38, and is secured thereto by the cotter pin 40 and the retaining washer 40a. At diametrically opposed points on the bell crank 39 are two pivot pins 41 and 42, a pair of straps 43 and 44 being pivotally connected to the bell crank 39 by the pins 41 and 42, respectively. A pintle 45 extends from the shutter lug 46 on the shutter plate 34, and is connected to the strap 43 by the eye bolt 47. A pair of nuts 48 and 49 adjustably secure the eye bolt 47 to the strap 43, while the cotter pin 50 retains the eye bolt 47 on the pintle 45. Similarly, the strap 44 is connected to the pintle 51 of the shutter lug 52 projecting beneath the shutter plate 35, by the eye bolt 53 and the securing nuts 54 and 55.

When the bell crank 39 is turned in a clockwise direction, as viewed in Figure 4, it is apparent that the shutter plates 34 and 35 move away from the center bridging member 25. Counterclockwise rotation of the bell crank 39 results in movement of the shutter plates 34 and 35 in the opposite direction, whereupon the apertures 37 may be brought into register with the discharge opening 22 in varying degree. In order to provide manual control of the position of the shutter plates 34 and 35 relative to the bottom plate 11, I provide a handle 56 (Figure 1), which pivots about the pin 57 and is connected to the arm 58 of the bell crank 39 by the connecting rod 59. The lower end portion of the control handle 56 operates in a slot 60 in the drawbar 26, the movement of said lower end portion relative to the drawbar 26 being adjustable by means of the flow regulator plate 61, which is adjustably secured to the drawbar 26 by the fastener 62. When the control handle 56 is in the position shown in Figure 1, the shutter plates 34 and 35 are moved away from the center bridging member 26 to the closed position. Upon turning the handle 56 in the opposite direction, however, the discharge openings 22 are uncovered, to the extent that the flow regulator plate 61 permits rotational movement of the lower end portion of the control handle 56 along the slot 60.

Referring now to Figure 3, a stub shaft 63 extends through the end wall 15 and is driven by the wheel 64, the bearing support for the shaft 63 including the thrust collar 65, which is secured in place by the fastener 66. A similar stub shaft 63, not shown, is driven by the wheel 67 and extends into the interior of the hopper 10 at the opposite end wall 14. A center brace 68 (Figures 3 and 5) extends between the two upper edges of the bottom plate 11, and supports the bearing 69, said bearing being secured to the brace 68 by the fasteners 70 and 71. A drive shaft 72 is supported at one end thereof by the bearing 69, the other end of the shaft 72 being drivably connected to the stub shaft 63 by the coupling members 73 and 74, and their associated fasteners 75 and 76. A thrust collar 77 is secured to the drive shaft 72 by the fastener 78, while lubricant is supplied to the bearing 69 through the lubricant fitting 79. A second drive shaft 80 is supported at one end thereof by the bearing 69, and is also provided with a thrust collar 81 secured thereto by the fastener 82.

Referring now to Figures 3 and 6, the drive shaft 72 is shown as having a plurality of wobble plates 83 spaced therealong, said plates 83 being inclined approximately 25 degrees from a plane perpendicular to the shafts 72 and 80, although obviously other angles of pitch may be used. Each of the wobble plates 83 includes a major lobe 84 and a minor lobe 85, the respective leading edges 86 and 87 of which are substantially radial and circumferentially spaced from each other approximately 180 degrees. In addition to being larger in area than the minor lobe 85, the major lobe 84 is also proportioned such that the radial distance from the axis of rotation of the shaft 72 to its center of gravity is greater than the radial distance to the center of gravity of the minor lobe 85. Figure 3 shows the wobble plates 83 as being circumferentially spaced around the shaft 72 for a purpose more fully disclosed below, while in addition, Figure 3 shows the coupling members 73 and 74 as including a minor lobe 88 and a major lobe 89, respectively. The drive shaft 80, only one end portion of which is shown, also includes a plurality of wobble plates 90 arranged similarly, except that the wobble plates 90 are pitched oppositely from the wobble plates 83.

In addition to the wobble plates 83 and 90, the shafts 72 and 80 include a plurality of substantially disk-shaped feed members 91 which operate in the discharge opening 22. Each of the feed members 91 includes a plurality of stepped feeder teeth 92, while the members 91 are so positioned on the drive shafts 72 and 80 as to penetrate into the rectangular portion 23 of the discharge openings 22 adjacent to the unbroken straight edge thereof (Figure 7). In addition, each of the feed members 91 is provided with a pair of tangs 93 and 94, which extend radially to the working circle of the feeder teeth 92, and from which wings 95 and 96 project respectively. Each of the wings 95 and 96 extends to the same side of the feed member 91, and is inclined from the plane of rotation of said member 91 to sweep material away from the feeder teeth 92 as the shaft 72 (or 80) rotates in the direction indicated by the arrows of Figure 3. A breaker arm 97 projects from that side of the feed member 91 which faces the principal discharge area 24, said arm 97 extending radially to substantially the same extent as the feeder teeth 92, so that said arm 97 also penetrates an appreciable amount into the discharge openings 22 during each revolution of the feed member 91. Another breaker arm 98 extends from the opposite side of the feed member 91; however the arm 98 terminates short of the feeder teeth 92, so as not to interfere with the bottom plate 11 upon rotation of the feed member 91. In addition, each of the feed members 91 adjacent to the center bearing 69 and the end thrust collars 65, is provided with an agitator arm 11 which breaks up cohered or packed material with which it comes into contact.

The operation of the embodiment of my invention above described, is as follows: The drawbar 26 is hitched to a tractor or other propelling vehicle, the hopper 10 is filled with the material to be dispensed, and the regulator plate 61 is set to limit movement of the shutter plates 34 and 35 to provide an effective discharge area, as for example that shown in Figure 7, for obtaining a particular rate of flow of material from the hopper 10. As the device is pulled forward, the wheels 64 and 67 drive the shafts 72 and 80, and the wobble plates 83 and 90 and feed members 91 secured thereto. I prefer that the wobble plates 83 and 90 and the feed members 91 be of hard, abrasion resistant material, as for example case hardened or heat treated steel, so that they will pulverize and grind up any material which they contact, without being abraded or otherwise damaged.

Referring now to a single wobble plate 83 on the shaft 72, as said shaft 72 turns the major lobe 84 propels a greater quantity of material toward the bearing 69, than the minor lobe 85 propels toward the end wall 15 of the hopper 10. In this manner, oppositely directed substantially co-axial flows are caused by the new partly broken off wobble plates. The outer differential flow, at least a part of which passes over the hopper bottom, is particularly important for the functioning of the machine. As noted above, uniform distribution of such flow, over the hopper bottom, is desirable; and this is greatly aided by the reverse differential inner flow. Again the operation of the feed members 91 is improved by the so insured uniformity of material delivery to the feed members. The differential flow of material, in this case toward the bearing 69, is a function principally of (a) the area of the cylindrical projection of the lobes 84 and 85, and (b) the radius of the center of gravity of the projected areas with respect to the shaft 72. By "cylindrical projection," as used to define the effective thrust areas of the lobes 84 and 85, is meant the projection of said lobes on a cylinder concentric with the shaft 72. While a difference in either the thrust areas or the radii of the centers of gravity of said lobes is all that is required to obtain a differential flow of material lengthwise of the shaft 72, in practice both are preferably employed, as in the case of the wobble plates 83 shown in Figure 6. While the wobble plates 90 on the shaft 80 are similar in form to the wobble plates 83, they are pitched oppositely from said wobble plates 83, so that the differential flow of material is again toward the bearing 69. Thus, the wobble plates 83 and 90 combine to prevent accumulation of material at the ends of the hopper 10.

At the same time, the feed members 91 act as baffle plates against which the wobble plates 83 and 90 project material. Since the feed members 91 act as a partial barrier against movement of material along the shafts 72 and 80, an appreciable portion of the material which is fed along said shafts by the lobes 84 and 85 as the latter dip below the center line of the shafts 72 and 80, is forced upwardly as it piles against the adjacent members 91. However, while the wobble plates 83 and 90 are forcing material toward one of the two adjacent feed members 91, those portions of said plates above the center line of the shafts 72 and 80 are simultaneously camming material in a more or less downwardly direction, as well as along said shafts. Consequently there is a continuous pulsation of material up and down within the hopper 10 as the shafts 72 and 80 turn. This effect is of special importance since it acts to agitate all of the material within the hopper 10 and thereby helps prevent the formation of tunnels in the material being dispensed.

In practice I have found that there is little tendency for the material being dispensed to cling or cohere to the surfaces of the armature. Where highly cohesive material is being dispensed this fact can mean the difference between the spreader operating smoothly and efficiently, or becoming so clogged as to be nonoperative. This desirable operating feature of my invention apparently stems principally from two factors. First, the surfaces of the wobble plates 83 and 90 are inclined, so that the angle of impact is always oblique and the particles of material have an opportunity to slide over the surfaces of said plates 83 and 90. Second, the up-and-down movement of material between each successive pair of feed members 92 again avoids direct (or right angle) impact of material against the surfaces of said members 92.

Because the stress imposed on the shafts 72 and 80 by each of the wobble plates 83 and 90 is not uniform as the shafts 72 and 80 turn, I prefer to space the plates 83 and 90 circumferentially, so that the fluctuations in stresses tend to balance each other out, the maximum shearing and bending stresses thereby being substantially less than would be the case if the plates 83 and 90 were not staggered.

While I have shown and described certain preferred embodiments of my invention, it is to be understood that these embodiments have been given by way of example only and that various changes and rearrangements of the details shown therein may be made without departing from the spirit of the invention, the scope of which is defined in the appended claims.

I claim:

1. A material spreader including a ported hopper and a rotatable shaft therein, a set of uniform members to agitate and distribute material in the hopper, each of said members comprising a substantially plate shaped member carried by said shaft and rotatable therewith, the plane of said member being inclined from that of its rotation upon said shaft, said member including two angularly spaced lobes, said lobes being of different size whereby they displace differently directed and substantially longitudinal flows of material within the hopper when the shaft revolves.

2. In a material spreader, a ported hopper, a rotatable shaft therein, and a set of uniform devices to agitate and distribute material in the hopper, each of said devices comprising a substantially plate shaped member carried by said shaft and rotatable therewith, the plane of said member being inclined from that of its rotation upon said shaft, said member including at least two angularly spaced lobes of different average distance from said shaft, whereby they displace concentric longitudinally directed, countercurrent flows of material in the hopper when the shaft revolves.

3. In a material spreader, a ported hopper and rotatable shaft means therein to agitate and distribute material in the hopper, said means comprising a series of uniform substantially plate shaped members carried by said shaft and rotatable therewith, the plane of each member being inclined from that of its rotation upon said shaft, each member including at least two lobes, angularly spaced from one another, having different thrust areas and having their respective centers of gravity differently spaced from said shaft, whereby they displace countercurrent, concentric and substantially longitudinal flows of material within the hopper when the shaft revolves.

4. A material spreader including a hopper, a rotatable shaft therein, and means to agitate and distribute material in the hopper, said means comprising a series of uniform wobble plates on said shaft, each wobble plate comprising at least one major lobe of relatively large area, with the center of gravity spaced relatively far from the shaft, and at least one minor lobe of relatively small area and with the center of gravity relatively closely spaced from the shaft.

5. A material spreader including a hopper, a longitudinal series of discharge ports in a wall of said hopper, a longitudinal shaft in said hopper, and a series of identical wobble plates in said hopper, on said shaft, intermediate said discharge ports, each wobble plate comprising at least one relatively long vane and at least one relatively short vane, said vanes being angularly spaced from one another and lying in substantially identical planes inclined from the planes of rotation of the shaft.

6. In a material spreader, a ported hopper, a rotatable shaft therein, means for agitating material within the hopper and moving it longitudinally of said shaft, said means comprising a series of substantially identical wobble plates on said shaft, each of said wobble plates comprising two vanes and each of said vanes having a radial leading edge spaced from the trailing edge of the other vane, said vanes being inclined from said shaft and having different effective thrust areas.

7. In a material spreader, a ported hopper, a rotatable shaft therein, and means for agitating material in the hopper and distributing it over the hopper bottom, said means comprising a series of uniform, substantially flat plates spaced on said shaft, the plane of each of said plates being inclined from that of the rotation of said shaft; each of said plates including at least two angularly spaced lobes of different areas, the leading edges of such lobes being cyclically staggered along the shaft.

8. A material spreader including a hopper having two end walls and a bottom plate therebetween, said bottom plate having a plurality of discharge ports therein, a shaft in said hopper adapted to be rotated normally in a certain direction, a series of uniform plates on said shaft, including a wobble plate on said shaft adjacent one of said end walls, said wobble plate including at least two angularly spaced lobe portions of different effective thrust areas, the wobble plate being so corelated with the aforesaid rotation of the shaft as to direct more material away from the adjacent end wall than toward the same.

FORTUNATO S. AJERO.

References Cited in the file of this patent

UNITED STATES PATENTS

| Number | Name | Date |
| --- | --- | --- |
| 247,330 | Franklin | Sept. 20, 1881 |
| 668,026 | Temples | Feb. 12, 1901 |
| 1,104,246 | Cole | July 21, 1914 |
| 1,248,032 | Synck | Nov. 27, 1917 |
| 2,510,231 | Juzwiak | June 6, 1950 |
| 2,541,008 | Stahmer | Feb. 6, 1951 |